United States Patent
Muthiah et al.

(10) Patent No.: US 12,081,428 B2
(45) Date of Patent: Sep. 3, 2024

(54) METHOD AND SYSTEM FOR TESTBENCH COMPONENT LOCK-UP IDENTIFICATION DURING SIMULATION

(71) Applicant: HCL America Inc., Sunnyvale, CA (US)

(72) Inventors: Manickam Muthiah, Shrewsbury, MA (US); Rohit Kumar, Shrewsbury, MA (US); Shashank Nafde, Milpitas, CA (US); Razi Abdul Rahim, Willowbrook, IL (US)

(73) Assignee: HCL America Inc.

( * ) Notice: Subject to any disclaimer, the term of this patent is extended or adjusted under 35 U.S.C. 154(b) by 386 days.

(21) Appl. No.: 17/674,895

(22) Filed: Feb. 18, 2022

(65) Prior Publication Data
US 2023/0269163 A1    Aug. 24, 2023

(51) Int. Cl.
*H04L 43/50* (2022.01)
*H04L 12/42* (2006.01)
*H04L 43/12* (2022.01)

(52) U.S. Cl.
CPC .............. *H04L 43/50* (2013.01); *H04L 12/42* (2013.01); *H04L 43/12* (2013.01)

(58) Field of Classification Search
CPC ......... H04L 43/50; H04L 12/42; H04L 43/12; H04L 41/145; H04L 43/045; H04L 43/062; H04L 49/3063; H04L 49/501; H04L 49/9047; G06F 9/3004; G06F 11/1044; G06F 12/0238; G06F 12/1081; G06F 13/28; G06F 9/3001; G06F 9/30145;

(Continued)

(56) References Cited

U.S. PATENT DOCUMENTS

| | | | |
|---|---|---|---|
| 6,819,662 B1* | 11/2004 | Grover | H04L 45/124 370/258 |
| 6,850,486 B2* | 2/2005 | Saleh | H04J 14/0295 370/395.2 |
| 6,973,049 B2 | 12/2005 | Mor | |

(Continued)

OTHER PUBLICATIONS

David Rich; The Missing Link: The Testbench to DUT Connection; 2012; Fremont, CA.

*Primary Examiner* — Rushil P. Sampat
(74) *Attorney, Agent, or Firm* — Kendal M. Sheets

(57) ABSTRACT

A method for identifying locked-up simulation testbench components during a simulation is disclosed. In some embodiments, the method includes creating, by an initiator simulation testbench component, at least one migrant packet. The method further includes circulating, during a component identification cycle, each of the at least one migrant packet in an associated predefined direction through each of the plurality of simulation testbench components in the associated daisy loop from the at least one daisy loop. The method further includes circulating, during an issue identification cycle, each of the least one migrant packet in the associated predefined direction through each of the plurality of simulation testbench components in the associated daisy loop. The method further includes identifying, by a migrant packet from the at least one migrant packet, a locked-up simulation testbench component from the subsequent simulation testbench components based on the at least one attribute associated with locked-up simulation testbench component.

23 Claims, 8 Drawing Sheets

(58) Field of Classification Search
CPC .... G06F 9/30189; G06F 9/355; G06F 9/3851; G06F 9/5027; G06F 12/0284; G06F 2212/6026
See application file for complete search history.

(56) References Cited

U.S. PATENT DOCUMENTS

| | | |
|---|---|---|
| 7,363,362 B1* | 4/2008 | Friedman ................ H04L 12/42 379/201.1 |
| 8,179,787 B2 | 5/2012 | Knapp |
| 9,817,067 B2 | 11/2017 | Patel et al. |
| 10,938,964 B2 | 3/2021 | Mirsky |
| 2008/0198768 A1* | 8/2008 | Nanjundaswamy .. H04L 12/437 370/255 |
| 2018/0026844 A1* | 1/2018 | Smaak .................... H04L 12/42 370/216 |
| 2019/0294738 A1 | 9/2019 | Muthiah et al. |
| 2021/0168041 A1* | 6/2021 | Otte ...................... H04L 41/145 |
| 2022/0045922 A1* | 2/2022 | Meyer ..................... H04L 69/22 |
| 2022/0224605 A1* | 7/2022 | Jain ......................... G06F 9/355 |

* cited by examiner

| Simulation Testbench Components | Unique IDs 204 | Timeout value 206 | Sequence of Simulation testbench components 208 |
|---|---|---|---|
| Component A | COMP1 | 1000 ns | COMP1 |
| Component B | COMP2 | 850 ns | COMP1-COMP2 |
| Component C | COMP3 | 500 ns | COMP1-COMP2-COMP3 |
| Component D | COMP4 | 700 ns | COMP1-COMP2-COMP3-COMP4 |
| Component E | COMP5 | 600 ns | COMP1-COMP2-COMP3-COMP4-COMP5 |
| Component F | COMP6 | 540 ns | COMP1-COMP2-COMP3-COMP4-COMP5-COMP6 |
| Component G | COMP7 | 900 ns | COMP1-COMP2-COMP3-COMP4-COMP5-COMP6-COMP7-COMP1 |

FIG. 2

| Simulation Testbench Components 302 | Unique IDs 304 | Timeout value 306 | Sequence of Simulation testbench components 308 |
|---|---|---|---|
| Component A | COMP1 | 1000 ns | COMP1 |
| Component G | COMP7 | 900 ns | COMP1-COMP7 |
| Component F | COMP6 | 540 ns | COMP1-COMP7-COMP6 |
| Component E | COMP5 | 600 ns | COMP1-COMP7-COMP6-COMP5 |
| Component D | COMP4 | 700 ns | COMP1-COMP7-COMP6-COMP5-COMP4 |
| Component C | COMP3 | 500 ns | COMP1-COMP7-COMP6-COMP5-COMP4-COMP3 |
| Component B | COMP2 | 850 ns | COMP1-COMP7-COMP6-COMP5-COMP4-COMP3-COMP2-COMP1 |

FIG. 3

METHOD AND SYSTEM FOR TESTBENCH COMPONENT LOCK-UP IDENTIFICATION DURING SIMULATION

TECHNICAL FIELD

Generally, the invention relates to simulation lock-up condition. More specifically, the invention relates to method and system for identifying locked-up simulation testbench components during simulation.

BACKGROUND

From beginning of logic design, a design under test (DUT) represents a boundary between what will be implemented in hardware and everything else required to validate the implementation. In order to verify DUT functionality, a testbench (a simulation), i.e., a verification environment acts as a main component which generates stimulus and verifies the DUT functionality by comparing the DUT outputs with expected values. During a simulation, when a simulation testbench component (also referred as a testbench component) from a number of simulations components gets stuck or locked-up due to an issue with the DUT response or a handshake issue, then the simulation may also get locked-up. Examples of the testbench components may include driver, monitor, scoreboard, and similar other components. Moreover, identifying such a locked-up simulation testbench component won't be achievable until the simulation is killed by a global timeout.

Furthermore, when the simulation has a large number of simulation testbench components, it may be difficult to determine which simulation testbench component caused the simulation to be locked-up. Currently, not many techniques are available to identify such conditions of locked-up simulation testbench components. However, some of the existing techniques, for example, in Universal Verification Methodology (UVM), UVM heartbeat mechanism can be used to identify such conditions of locked-up simulation testbench components. But the existing UVM heartbeat mechanism requires a considerable number of settings/configurations to enable monitoring of the simulation testbench components (for example: drivers, monitors, etc.). Moreover, in the existing UVM heartbeat mechanism, the simulation testbench components that are to be monitored need to raise or drop objections periodically, which might not be preferable always, since objections are primarily used to control when the simulation ends.

Therefore, there is a need of implementing an efficient and reliable method and system for identifying locked-up simulation testbench components during simulation.

SUMMARY OF INVENTION

In one embodiment, a method for identifying locked-up simulation testbench components during a simulation is disclosed. The method may include creating, by an initiator simulation testbench component from a plurality of simulation testbench components, at least one migrant packet. It should be noted that, the plurality of simulation testbench components are sequentially connected in at least one daisy loop. The method may include circulating, during a component identification cycle, each of the at least one migrant packet in an associated predefined direction through each of the plurality of simulation testbench components in the associated daisy loop from the at least one daisy loop. It should be noted that, each of the at least one migrant packet returns to the initiator simulation testbench component at completion of the component identification cycle. In addition, circulating includes determining by each of the at least one migrant packet at least one attribute associated with each of the plurality of simulation testbench components. The method may include circulating, during an issue identification cycle, each of the at least one migrant packet in the associated predefined direction through each of the plurality of simulation testbench components in the associated daisy loop. It should be noted that, circulating each of the at least one migrant packet includes initiating, by the initiator simulation testbench component, a timer in each of the at least one migrant packet before initiating circulation of the at least one migrant packet. The circulating each of the at least one migrant packet further includes sending, by the initiator simulation testbench component, each of the at least one migrant packet to subsequent simulation testbench components from the plurality of simulation testbench components. It should be noted that, each of the at least one migrant packet is passed on in a sequential manner amongst the plurality of simulation testbench components based on the associated daisy loop. The circulating each of the at least one migrant packet further includes performing, by each of the subsequent simulation testbench components, at least one of: receiving a migrant packet from a preceding simulation testbench component in the associated daisy loop, resetting the timer associated with the migrant packet to a predefined value after reaching an idle state, and sending, the migrant packet, to a subsequent simulation testbench component in the associated daisy loop, in response to resetting the timer. The method may include identifying, by a migrant packet from the at least one migrant packet, a locked-up simulation testbench component from the subsequent simulation testbench components based on the at least one attribute associated with locked-up simulation testbench component. It should be noted that, the locked-up simulation testbench component fails to reset the timer associated with the migrant packet.

In another embodiment, a simulation testbench component for identifying locked-up simulation testbench components during a simulation is disclosed. The simulation testbench component may be configured to create at least one migrant packet before starting a component identification cycle. The simulation testbench component may be configured to circulate, during the component identification cycle, each of the at least one migrant packet in the associated predefined direction through each of the plurality of simulation testbench components in an associated daisy loop from at least one daisy loop. It should be noted that, each of the at least one migrant packet returns to the simulation testbench component at completion of the component identification cycle. The simulation testbench component may be configured to determine, during the component identification cycle, by each of the at least one migrant packet, at least one attribute associated with each of the plurality of simulation testbench components. The simulation testbench component may be configured to circulate, during an issue identification cycle, each of the at least one migrant packet in the associated predefined direction through each of the plurality of simulation testbench components in the associated daisy loop. In order to initiate the circulation, the simulation testbench component may be configured to initiate a timer in each of the at least one migrant packet before initiating circulation of the at least one migrant packet. Further, in order to initiate the circulation, the simulation testbench component may be configured to send each of the at least one migrant packet to subsequent simulation testbench components from the plurality of simulation testbench components. It should be noted that each of the at least one migrant packet is passed on in a sequential manner amongst the plurality of simulation testbench components based on the associated daisy loop.

In yet another embodiment, a simulation testbench component for identifying locked-up simulation testbench components during a simulation is disclosed. The simulation testbench component may be configured to receive, during an issue identification cycle, a migrant packet from a preceding simulation testbench component connected in an associated daisy loop from at least one daisy loop. The simulation testbench component may be configured to reset a timer associated with the migrant packet to a predefined value after reaching an idle state. It should be noted that, the timer associated with the migrant packet is reset upon identifying non-busy state of a subsequent simulation testbench component. The simulation testbench component may be configured to send, the migrant packet, to the subsequent simulation testbench component in the associated daisy loop, in response to resetting the timer.

In yet another embodiment, a system for identifying locked-up simulation testbench components during a simulation is disclosed. The system includes a processor and a memory communicatively coupled to the processor. The memory may store processor-executable instructions, which, on execution, may cause the processor to create, by an initiator simulation testbench component from a plurality of simulation testbench components, at least one migrant packet. It should be noted that, the plurality of simulation testbench components are sequentially connected in at least one daisy loop. The processor-executable instructions, on execution, may further cause the processor to circulate, during a component identification cycle, each of the at least one migrant packet in an associated predefined direction through each of the plurality of simulation testbench components in the associated daisy loop from the at least one daisy loop. It should be noted that, each of the at least one migrant packet returns to the initiator simulation testbench component at completion of the component identification cycle. In addition, to circulate each of the at least one migrant packet during the component identification cycle, the processor executable instruction further causes the process to determine, by each of the at least one migrant packet, at least one attribute associated with each of the plurality of simulation testbench components. The processor-executable instructions, on execution, may further cause the processor to circulate, during an issue identification cycle, each of the at least one migrant packet in the associated predefined direction through each of the plurality of simulation testbench components in the associated daisy loop. It should be noted that, to circulate each of the at least one migrant packet during the issue identification cycle, the processor executable instruction further causes the processor to initiate, by the initiator simulation testbench component, a timer in each of the at least one migrant packet before initiating circulation of the at least one migrant packet. In addition, to circulate each of the at least one migrant packet during the issue identification cycle, the processor executable instruction further causes the processor to send, by the initiator simulation testbench component, each of the at least one migrant packet to subsequent simulation testbench components from the plurality of simulation testbench components. It should be noted that, each of the at least one migrant packet is passed on in a sequential manner amongst the plurality of simulation testbench components based on the associated daisy loop. Moreover, to circulate each of the at least one migrant packet during the issue identification cycle, the processor executable instruction further causes the processor to perform, by each of the subsequent simulation testbench components, at least one of: receive a migrant packet from a preceding simulation testbench component in the associated daisy loop, reset the timer associated with the migrant packet to a predefined value after reaching an idle state, and send, the migrant packet, to a subsequent simulation testbench component in the associated daisy loop, in response to resetting the timer. The processor-executable instructions, on execution, may further cause the processor to identify, by a migrant packet from the at least one migrant packet, a locked-up simulation testbench component from the subsequent simulation testbench components based on the at least one attribute associated with locked-up simulation testbench component. It should be noted that, the locked-up simulation testbench component fails to reset the timer associated with the migrant packet.

It is to be understood that both the foregoing general description and the following detailed description are exemplary and explanatory only and are not restrictive of the invention, as claimed.

BRIEF DESCRIPTION OF THE DRAWINGS

The present application can be best understood by reference to the following description taken in conjunction with the accompanying drawing figures, in which like parts may be referred to by like numerals.

FIG. 2 represents a table depicting each of at least one attribute and a sequence of each of a plurality of simulation testbench components connected in a first daisy loop, in accordance with some exemplary embodiment.

FIG. 3 represents a table depicting each of at least one attribute and a sequence of each of a plurality of simulation testbench components connected in a second daisy loop, in accordance with some exemplary embodiment.

DETAILED DESCRIPTION OF THE DRAWINGS

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the invention is not intended to be limited to the embodiments shown, but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
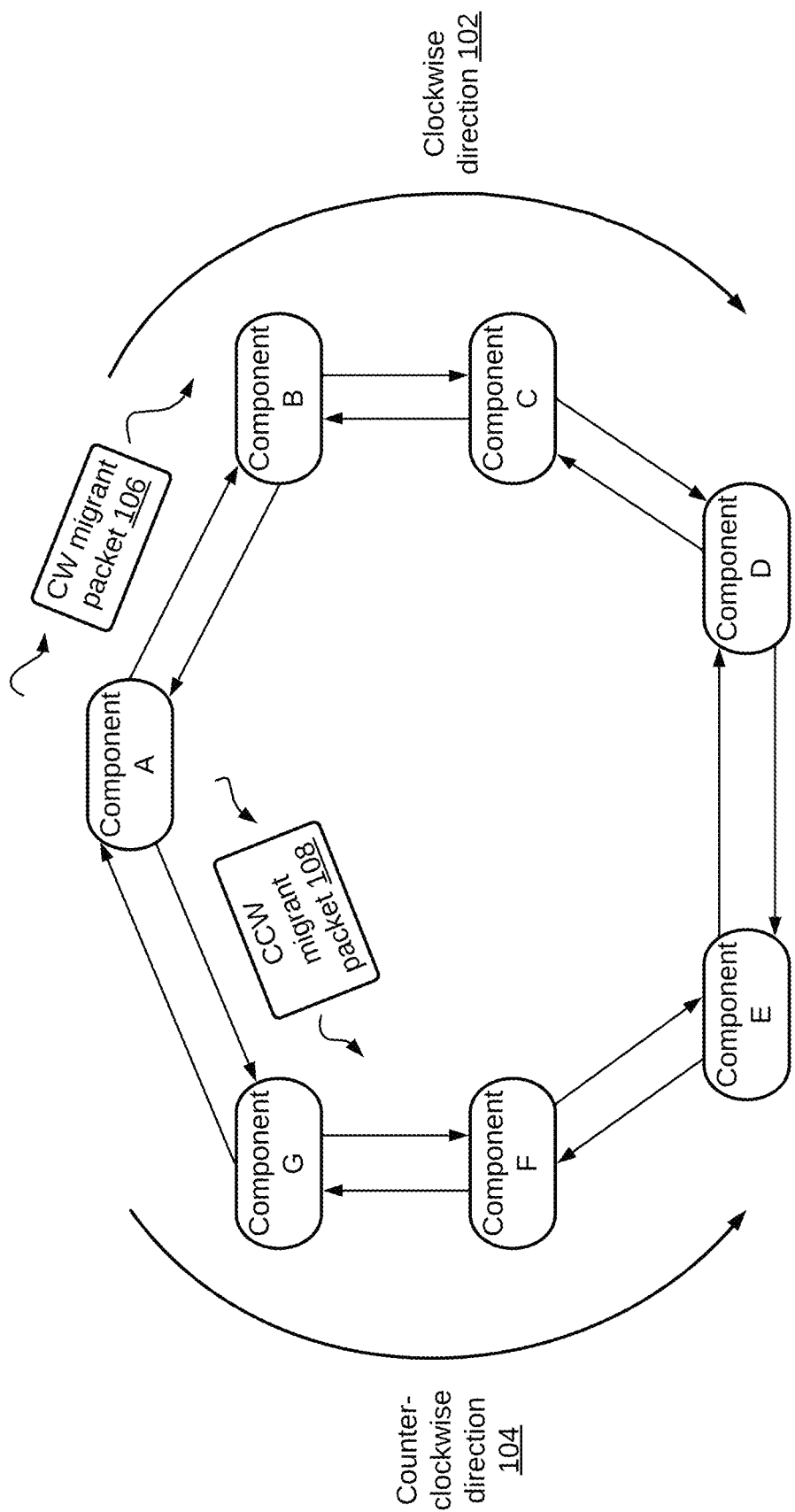
FIG. 1 illustrates a functional diagram of a plurality of simulation testbench components connected in at least one daisy loop for identifying locked-up simulation testbench components during a simulation, in accordance with an embodiment.

A functional diagram 100 of a plurality of simulation testbench components connected in at least one daisy loop for identifying locked-up simulation testbench components during a simulation is illustrated in FIG. 1, in accordance with an embodiment. In order to identify locked-up simulation testbench components during the simulation, a plurality of simulation testbench components may be sequentially connected in at least one daisy loop as depicted in present FIG. 1. In an embodiment, the at least one daisy loop may also be referred as a daisy chain loop. In addition, each of the plurality of simulation testbench components may also be referred as a testbench component. In present FIG. 1, the plurality of simulation testbench components connected in the at least one daisy loop may correspond to 'Component A', 'Component B', 'Component C', 'Component D', 'Component E', 'Component F', and 'Component G'. In addition, the at least one daisy loop may include a first daisy loop and a second daisy loop. In the first daisy loop, each of the plurality of simulation testbench components may be connected in a clockwise direction with respect to a first simulation testbench component, i.e., 'Component A', as represented via 'clockwise direction 102'. Further, in the second daisy loop, each of the plurality of simulation testbench components may be connected in a counter-clockwise direction with respect to the first simulation testbench component, i.e., 'Component A', as represented via 'counter-clockwise direction 104'.

In an embodiment, the first simulation testbench component from the plurality of simulation testbench component may act as an initiator simulation testbench component. The initiator simulation testbench component (i.e., the Component A) may be configured to create at least one migrant packet. The at least one migrant packet may include a first migrant packet and a second migrant packet. In present FIG. 1, the first migrant packet may correspond to a clockwise (CW) migrant packet 106. In addition, the second migrant packet may correspond to a counter-clockwise (CCW) migrant packet 108. Once the at least one migrant packet is created, then each of the at least one migrant packet may be circulated in an associated predefined direction through each of the plurality of simulation testbench components in an associated daisy loop (i.e., the first daisy loop and the second daisy loop) from the at least one daisy loop.

In other words, the first migrant packet (i.e., the CW migrant packet 106) may be circulated in the clockwise direction 102 along a clockwise daisy loop, i.e., the first daisy loop. By way of an example, the first daisy loop in which the CW migrant packet 106 is circulated may correspond to 'Component A-Component B-Component C-Component D-Component E-Component F-Component G-Component A'. In contrast, the second migrant packet (i.e., the CCW migrant packet 108) may be circulated in the counter-clockwise direction 104 along a counter-clockwise daisy loop, i.e., the second daisy loop. By way of an example, the second daisy loop in which the CCW migrant packet 108 is circulated may correspond to 'Component A-Component G-Component F-Component E-Component D-Component C-Component B-Component A'.

In an embodiment, each of the at least one migrant packet (i.e., the CW migrant packet 106 and the CCW migrant packet 108) may return to the initiator simulation testbench component (i.e., the Component A) after completing a cycle of the associated daisy loop. Further, during first cycle of the associated daisy loop, each of the at least one migrant packet, i.e., the CW migrant packet 106 and the CCW migrant packet 108 may be configured to determine at least one attribute associated with each of the plurality of migrant packet connect in the associated daisy loop. The at least one attribute associated with a simulation testbench component from the plurality of simulation testbench components may include a unique Identifier (ID) of the simulation testbench component and a timeout value associated with the simulation testbench component.

In addition, the CW migrant packet 106 and the CCW migrant packet 108 may be configured to determine a sequence in which each of the plurality of simulation testbench components may be connected in the associated daisy loop. The sequence may include ordered list of unique Identification (IDs) associated with each of the plurality of simulation testbench components. The first cycle may also be referred as a component identification cycle. As will be appreciated, one or both migrant packets may be created and circulated based on requirement of the simulation.

Once the component identification cycle is completed by the CW migrant packet 106 and the CCW migrant packet 108, then in subsequent cycle of the associated daisy loop, the CW migrant 106 and the CCW migrant packet 108 may be configured to identify a locked-up simulation testbench component from the plurality of simulation testbench components connected in the associated daisy loop. The subsequent cycle may also be referred as an issue identification cycle. Moreover, the issue may correspond to a locked-up simulation testbench component that causes the simulation to lock-up. This has been further explained in detail in conjunction to FIG. 2-FIG. 8.

Referring now to FIG. 2, a table 200 depicting each of at least one attribute and a sequence of each of a plurality of simulation testbench component connected in a first daisy loop is represented, in accordance with some exemplary embodiment. The table 200 may represent the plurality of simulation testbench components connected in the first daisy loop, i.e., the clockwise daisy loop. In reference to FIG. 1, the first daisy loop may correspond to 'Component A-Component B-Component C-Component D-Component E-Component F-Component G-Component A'. In table 200, each row of a first column, i.e., Simulation testbench components 202 may represent each of the plurality of simulation testbench components present in the associated daisy loop, i.e., the clockwise daisy loop. The plurality of simulation testbench components present in the clockwise daisy loop that are part of the simulation may be represented as 'Component A', 'Component B', 'Component C', 'Component D', 'Component E', 'Component F', 'Component G'.

Further, a second column and a third column of the table 200 may represent each of the at least one attribute associated with each of the plurality of simulation testbench components. In reference to FIG. 1, each of the at least one attribute associated with each of the plurality of simulation testbench components may be determined by a first migrant packet, i.e., the CW migrant packet 106 circulated in the clockwise direction 102, during the component identification cycle. In table 200, each row of the second column, i.e., Unique IDs 204 may represent the unique ID associated with each of the plurality of simulation testbench components connected in the clockwise daisy loop. As depicted by the second column, i.e., the Unique IDs 204 of the table 200, the unique ID associated with 'Component A', 'Component B', 'Component C', 'Component D', 'Component E', 'Component F', 'Component G' that are connected in the clockwise daisy loop may correspond to 'COMP1', 'COMP2', 'COMP3', 'COMP4', 'COMP5', 'COMP6', 'COMP7', respectively.

In addition, each row of the third column, i.e., timeout value 206, may represent a maximum time for which each of the plurality of simulation testbench components may hold the first migrant packet during the component identification cycle. As depicted via the third column, i.e., the timeout value 206 of the table 200, the maximum time for which each of the plurality of simulation testbench components, i.e., 'Component A', 'Component B', 'Component C', 'Component D', 'Component E', 'Component F', 'Component G', may hold the first migrant packet during the component identification cycle may correspond to '1000 nanoseconds (ns)', '850 ns', '500 ns', 700 ns', '600 ns', '540 ns', '900 ns', respectively. In reference to FIG. 1, the locked-up simulation testbench component from the plurality of simulations components may be identified in the subsequent cycle (i.e., the issue identification cycle) based on each of the at least one attribute determined by the first migrant packet during the first cycle, i.e., the component identification cycle.

Further, each row of a fourth column, i.e., Sequence of simulation testbench components 208, may represent the sequence in which each of the plurality of simulation testbench components may be connected in the first daisy loop. The sequence may include the ordered list of unique IDs associated with each of the plurality of simulation testbench components that are connected in the first daisy loop. In an embodiment, the sequence may depict a path in which the first migrant packet is transferred from the initiator simulation testbench component to each of the subsequent simulation testbench components of the plurality of simulation testbench components present in the first daisy loop, i.e., the clockwise daisy loop.

As depicted via first row of the fourth column, i.e., the Sequence of simulation testbench components 208, the sequence (the ordered list of unique IDs) at first simulation testbench component (i.e., the initiator simulation testbench component) may be depicted as 'COMP1'. Further, second row of the fourth column, may represent the sequence at second simulation testbench component (i.e., Component B) as 'COMP1-COMP2'. Third row of the fourth column, may represent the sequence at third simulation testbench component (i.e., Component C) as 'COMP1-COMP2-COMP3'. Fourth row of the fourth column, may represent the sequence at fourth simulation testbench component (i.e., Component D) as 'COMP1-COMP2-COMP3-COMP4'. Fifth row of the fourth column, may represent the sequence at fifth simulation testbench component (i.e., Component E) as 'COMP1-COMP2-COMP3-COMP4-COMP5'. Sixth row of the fourth column, may represent the sequence at sixth simulation testbench component (i.e., Component F) as 'COMP1-COMP2-COMP3-COMP4-COMP5-COMP6'.

Seventh row of the fourth column, may represent the sequence at seventh simulation testbench component (i.e., Component G) as 'COMP1-COMP2-COMP3-COMP4-COMP5-COMP6-COMP7-COMP1'. In present table 200, the seventh row of the fourth column may represent the sequence in which the first migrant packet may have been sequentially circulated through each of the plurality of simulation testbench components connected in the first daisy loop and have returned to the initiator simulation testbench component (i.e., Component A).

Referring now to FIG. 3, a table 300 depicting each of at least one attribute and a sequence of each of a plurality of simulation testbench components connected in a second daisy loop, in accordance with some exemplary embodiment. The table 300 may represent the plurality of simulation testbench components connected in the second daisy loop, i.e., the counter-clockwise daisy loop. In reference to FIG. 1, the second daisy loop may correspond to 'Component A-Component G-Component F-Component E-Component D-Component C-Component B-Component A'. In table 300, each row of a first column, i.e., Simulation testbench components 302 may represent each of the plurality of simulation testbench components connected in the counter-clockwise daisy loop. The plurality of simulation testbench components present in the counter-clockwise daisy loop that are part of the simulation may correspond to 'Component A', 'Component B', 'Component C', 'Component D', 'Component E', 'Component F', 'Component G'.

Further, a second column and a third column of the table 300 may represent one of the at least one attribute associated with each of the plurality of simulation testbench components. The at least one attribute of the simulation testbench component from the plurality of simulation testbench components may include the unique ID of the simulation testbench component and the timeout value associated with the simulation testbench component. In reference to FIG. 1, each of the at least one attribute associated with each of the plurality of simulation testbench components may be determined by a second migrant packet, i.e., the CCW migrant packet 108 circulated in the counter-clockwise direction 104, during the component identification cycle. As depicted in table 300, each row of the second column, i.e., Unique IDs 304 may represent a unique ID associated with each of the plurality of simulation testbench components present in the counter-clockwise daisy loop. As represented by the second column, i.e., the Unique IDs 304 of the table 300, the unique ID associated with 'Component A', 'Component G', 'Component F', 'Component E', 'Component D', 'Component C', 'Component B' that are connected in the counter-clockwise daisy loop may correspond to 'COMP1', 'COMP7', 'COMP6', 'COMP5', 'COMP4', 'COMP3', 'COMP2', respectively.

In addition, each row of the third column, i.e., a timeout value 306, may represent a maximum time for which each of the plurality of simulation testbench components may hold the second migrant packet during the component identification cycle. As depicted via the third column, i.e., the timeout value 306 of the table 300, the maximum time for which each of the plurality of simulation testbench components, i.e., 'Component A', 'Component G', 'Component F', 'Component E', 'Component D', 'Component C', 'Component B', may hold the second migrant packet during the component identification cycle may correspond to '1000 ns', '900 ns', '540 ns', '600 ns', 700 ns', '500 ns', '850 ns', respectively. In reference to FIG. 1, the locked-up simulation testbench component from the plurality of simulations testbench components may be identified in the subsequent cycle (i.e., the issue identification cycle) based on each of the at least one attribute determined by the second migrant packet during the first cycle, i.e., the component identification cycle.

Further, each row of a fourth column, i.e., Sequence of simulation testbench components 308, may represent the sequence in which the second migrant packet is circulated through the plurality of simulation testbench components connected in the second daisy loop. The sequence may include the ordered list of unique IDs associated with each of the plurality of simulation testbench components connected in the second daisy loop. In an embodiment, the sequence may depict a path in which the second migrant packet is transferred from the initiator simulation testbench component (i.e., Component A) to each of the subsequent simulation testbench components of the plurality of simulation testbench components connected in the second daisy loop, i.e., the counter-clockwise daisy loop.

As depicted via first row of the fourth column, i.e., the Sequence of simulation testbench components 308, the sequence (the ordered list of unique IDs) at first component (i.e., the initiator simulation testbench component) may be depicted as 'COMP1'. Further, second row of the fourth column, may represent the sequence at second simulation testbench component (i.e., Component G) as 'COMP1-COMP7'. Third row of the fourth column, may represent the sequence at third simulation testbench component (i.e., Component F) as 'COMP1-COMP7-COMP6'. Fourth row of the fourth column, may represent the sequence at fourth simulation testbench component (i.e., Component E) as 'COMP1-COMP7-COMP6-COMP5'. Fifth row of the fourth column, may represent the sequence at fifth simulation testbench component (i.e., Component D) as 'COMP1-COMP7-COMP6-COMP5-COMP4'. Sixth row of the fourth column, may represent the sequence at sixth simulation testbench component (i.e., Component C) as 'COMP1-COMP7-COMP6-COMP5-COMP4-COMP3'. Seventh row of the fourth column, may represent the sequence at seventh simulation testbench component (i.e., Component B) as 'COMP1-COMP7-COMP6-COMP5-COMP4-COMP3-COMP2-COMP1'. In present table 300, the seventh row of the fourth column may represent the sequence in which the second migrant packet may have been sequentially circulated through each of the plurality of simulation testbench components connected in the second daisy loop. In present table 300, the seventh row of the fourth column may represent the sequence in which the second migrant packet may have been sequentially circulated through each of the plurality of simulation testbench components connected in the second daisy loop and have returned to the initiator simulation testbench component (i.e., Component A).

Figure 4:
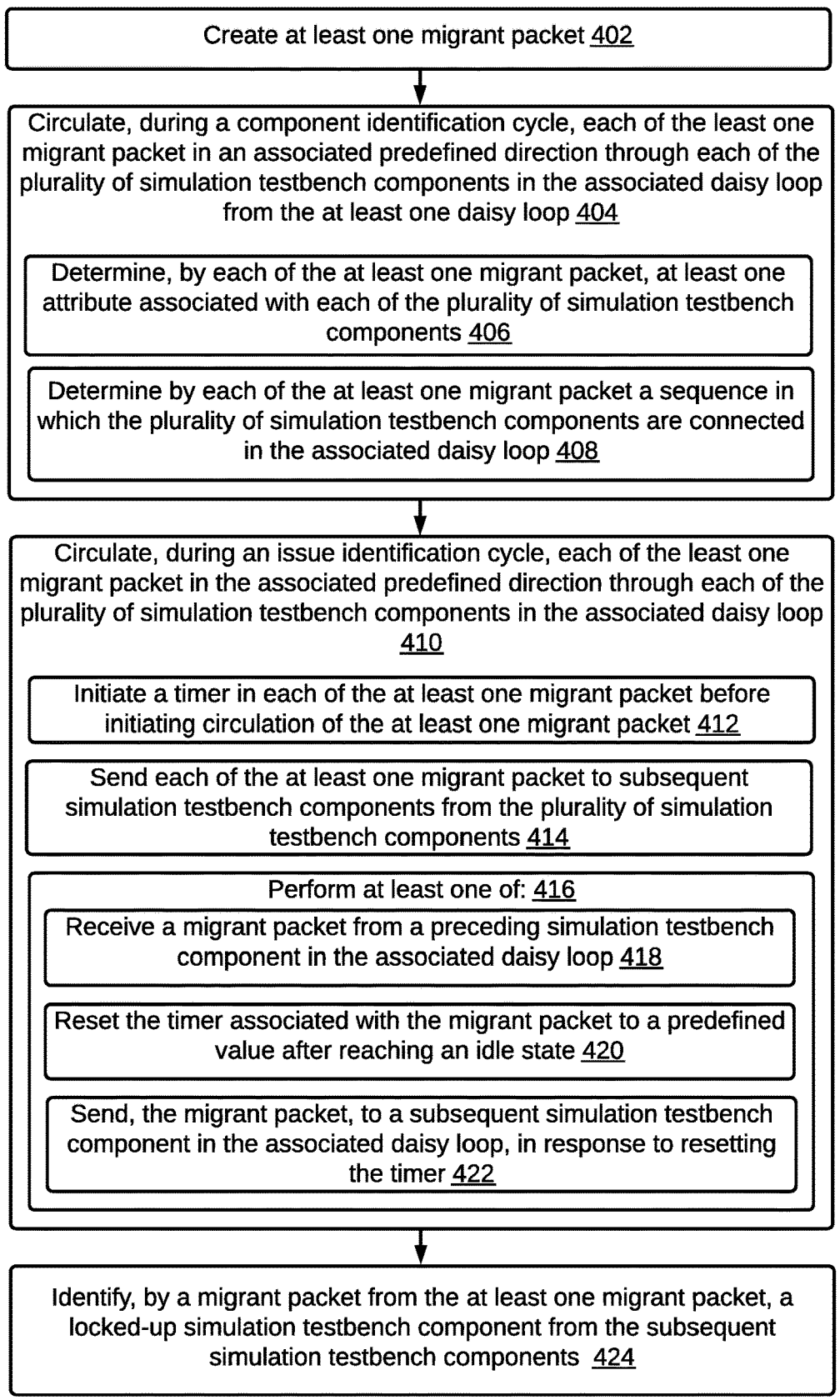
FIG. 4 illustrates a flowchart of a method for identifying locked-up simulation testbench components during a simulation, in accordance with an embodiment.

Referring now to FIG. 4, a flowchart of a method for identifying locked-up simulation testbench components during a simulation is illustrated, in accordance with an embodiment. At step 402, at least one migrant packet may be created. In an embodiment, the at least one migrant packet may be created by an initiator simulation testbench component from a plurality of simulation testbench components. In an embodiment, the plurality of simulation testbench components may be sequentially connected in at least one daisy loop. In addition, the at least one daisy loop may include a first daisy loop and a second daisy loop. In first daisy loop, the plurality of simulation testbench components may be connected in a clockwise direction with respect to the first simulation testbench component. In second daisy loop, the plurality of simulation testbench components may be connected in a counter-clockwise direction with respect to the first simulation testbench component. With reference to FIG. 1, the initiator simulation testbench component, i.e., the first simulation testbench component, may correspond to the 'Component A'

Once the at least one migrant packet is created, at step 404, each of the at least one migrant packet may be circulated in an associated predefined direction during a component identification cycle. With reference to FIG. 1, the component identification cycle may correspond to the first cycle. Each of the at least one migrant packet may be circulated through each of the plurality of simulation testbench components in an associated daisy loop from the at least one daisy loop. In an embodiment, each of the at least one migrant packet may return to the initiator simulation testbench component at completion of the component identification cycle.

Further, at step 406, during the component identification cycle, each of the at least one migrant packet may determine at least one attribute associated with each of the plurality of simulation testbench components. The at least one attribute of a simulation testbench component from the plurality of simulation testbench components may include a unique Identifier (ID) of the simulation testbench component and a timeout value associated with the simulation testbench component. Once the at least one attribute associated with each of the plurality of simulation testbench components is determined, then, at step 408, each of the at least one migrant packet may determine a sequence in which the plurality of simulation testbench components may be sequentially connected in the associated daisy loop. In an embodiment, the sequence in which the plurality of simulation testbench components may be connected may include an ordered list of unique IDs associated with each of the plurality of simulation testbench components.

Once the at least one attribute and the sequence associated with each of the plurality simulations components is identified, at step 410, during an issue identification cycle, each of the at least one migrant packet may be circulated in the associated predefined direction through each of the plurality of simulation testbench components in the associated daisy loop. In reference to FIG. 1, the issue identification cycle may correspond to each of the subsequent cycles for which each of the at least one migrant packet is circulated in the associated daisy loop. As will be appreciated, the each of the at least one migrant packet may be circulated in the associated predefined direction multiple times during the issue identification cycle. Further, in order to identify issue associated with one or more simulation testbench components from the plurality of simulation testbench components, at step 412, a timer may be initiated in each of the at least one migrant packet before initiating circulation of the at least one migrant packet. In an embodiment, the timer may be initiated by the initiator simulation testbench component.

At step 414, each of the at least one migrant packet may be sent to subsequent simulation testbench components from the plurality of simulation testbench components. Moreover, each of the at least one migrant packet may be passed on in a sequential manner amongst the plurality of simulation testbench components based on the associated daisy loop. Upon passing each of the at least one migrant packet sequentially in the associated daisy loop, at step 416, a component from the subsequent simulation testbench components may be configured to perform at least one of reception of a migrant packet from a preceding simulation testbench component in the associated daisy loop as depicted via step 418. In addition, upon receiving the each of the at least one migrant packet, each of the subsequent simulation testbench components may reset the timer associated with the migrant packet to a predefined value after reaching an idle state as depicted via step 420. In an embodiment, in order to reset the timer, each of the subsequent simulation testbench components may stop the timer in the migrant packet, upon identifying the timer to be running. Further, after waiting for a certain amount of resting time, each of the subsequent simulation testbench components may restart the timer in the migrant packet before sending the migrant packet to the subsequent simulation testbench component in the associated daisy loop. Further, at step 422, each of the subsequent simulation testbench components may send, the migrant packet, to a subsequent simulation testbench component in the associated daisy loop, in response to resetting the timer.

Thereafter, at step 424, a migrant packet from the at least one migrant packet circulated in the associated daisy loop may identify a locked-up simulation testbench component from the subsequent simulation testbench components based on the at least one attribute associated with locked-up simulation testbench component. In an embodiment, the locked-up simulation testbench component may correspond to a component connected in the at least one daisy loop that fails to reset the timer associated with the migrant packet. This has been further explained in detail in conjunction to FIG. 5-FIG. 8.

Figure 5:
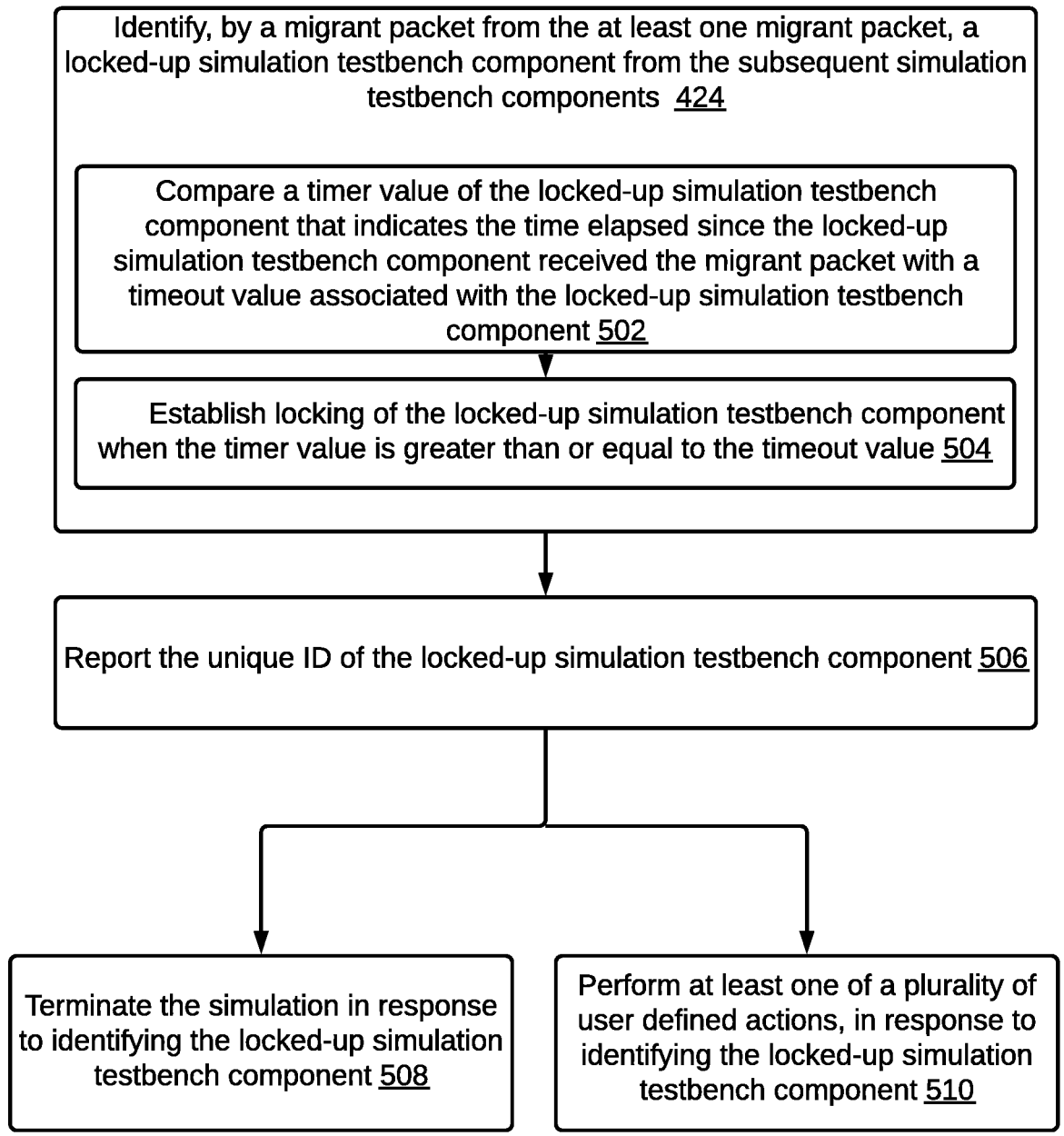
FIG. 5 illustrates a flowchart of a method for performing a suitable action upon identifying a locked-up simulation testbench component, in accordance with an embodiment.

Referring now to FIG. 5, a flowchart of a method for performing a suitable action upon identifying a locked-up simulation testbench component is illustrated, in accordance with an embodiment. In reference to FIG. 4, in order to identify the locked-up stimulation component as mentioned in step 424, at step 502, the migrant packet may compare the timer value that indicates the time elapsed since the locked-up simulation testbench component received the migrant packet with a timeout value associated with the locked-up simulation testbench component. Thus, the timer of each of the at least one migrant packet may be started or stopped multiple times. Based on comparison of the timeout value associated with the locked-up simulation testbench component, at step 504, the migrant packet may establish locking of the locked-up simulation testbench component upon identifying its timer value to be greater than or equal to the timeout value. In some embodiment, the timeout value for each of the plurality of simulation testbench components may be user configurable.

Once the locked-up simulation testbench component is identified, at step 506, the unique ID associated with the locked-up simulation testbench component may be reported to the user. The unique ID associated with the locked-up simulation testbench component may be reported by the migrant packet being circulated in the associated daisy loop. In an embodiment, the locked-up simulation testbench component may also be referred as a stuck simulation testbench component.

In one embodiment, upon identifying and reporting the unique ID associated with the locked-up simulation testbench component, at step 508, the migrant packet may terminate the simulation. In an embodiment, the migrant packet may terminate the simulation by displaying a fatal error message, based on requirement. In another embodiment, upon identifying and reporting the unique ID associated with the locked-up simulation testbench component, at step 510, the migrant packet may perform at least one of a plurality of user defined actions. In an embodiment, the plurality of user defined actions may include at least one of reset of the locked-up simulation testbench component and reset of a Design Under Test (DUT). The reset of the locked-up simulation testbench component and reset of the DUT may clear lock-up condition occurred during the simulation, thereby enabling the simulation to proceed further. However, performing reset of at least one of the locked-up simulation testbench component and the DUT might include risk associated with loss of the at least one migrant packet of the associated daisy loop.

Figure 6:
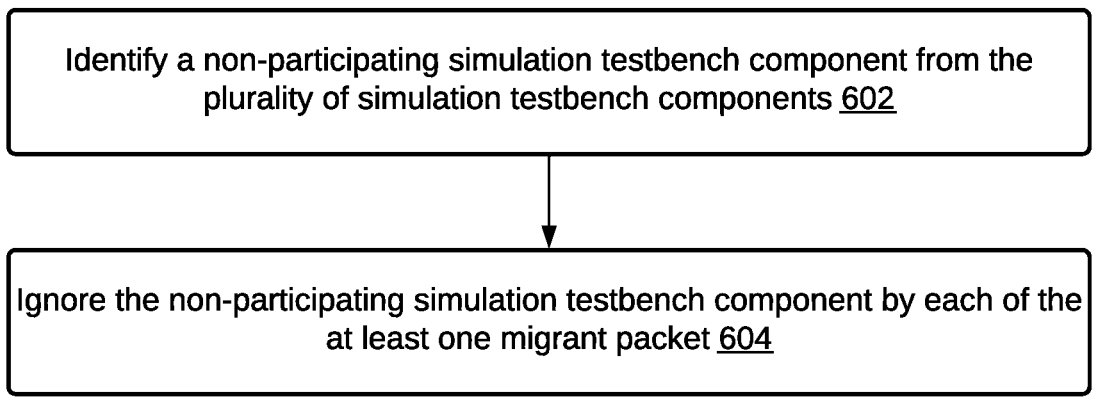
FIG. 6 represents a flowchart of a method of ignoring a non-participating simulation testbench component from a plurality of simulation testbench components, in accordance with an embodiment.

Referring now to FIG. 6, a flow diagram of a method of ignoring a non-participating simulation testbench component from a plurality of simulation testbench components is represented, in accordance with an embodiment. In order to ignore the non-participating simulation testbench component, at step 602, the non-participating simulation testbench component may be identified from the plurality of simulation testbench components. Moreover, the non-participating simulation testbench component may be identified based on a non-participation field activated in the non-participating simulation testbench component. In an embodiment, the non-participating simulation testbench components may correspond to a simulation testbench component from the plurality of simulation testbench components that is not required to be monitored during the simulation. Once the non-participating simulation testbench component is identified, at step 604, the non-participating simulation testbench component may be ignored by each of the at least one migrant packet.

Figure 7:
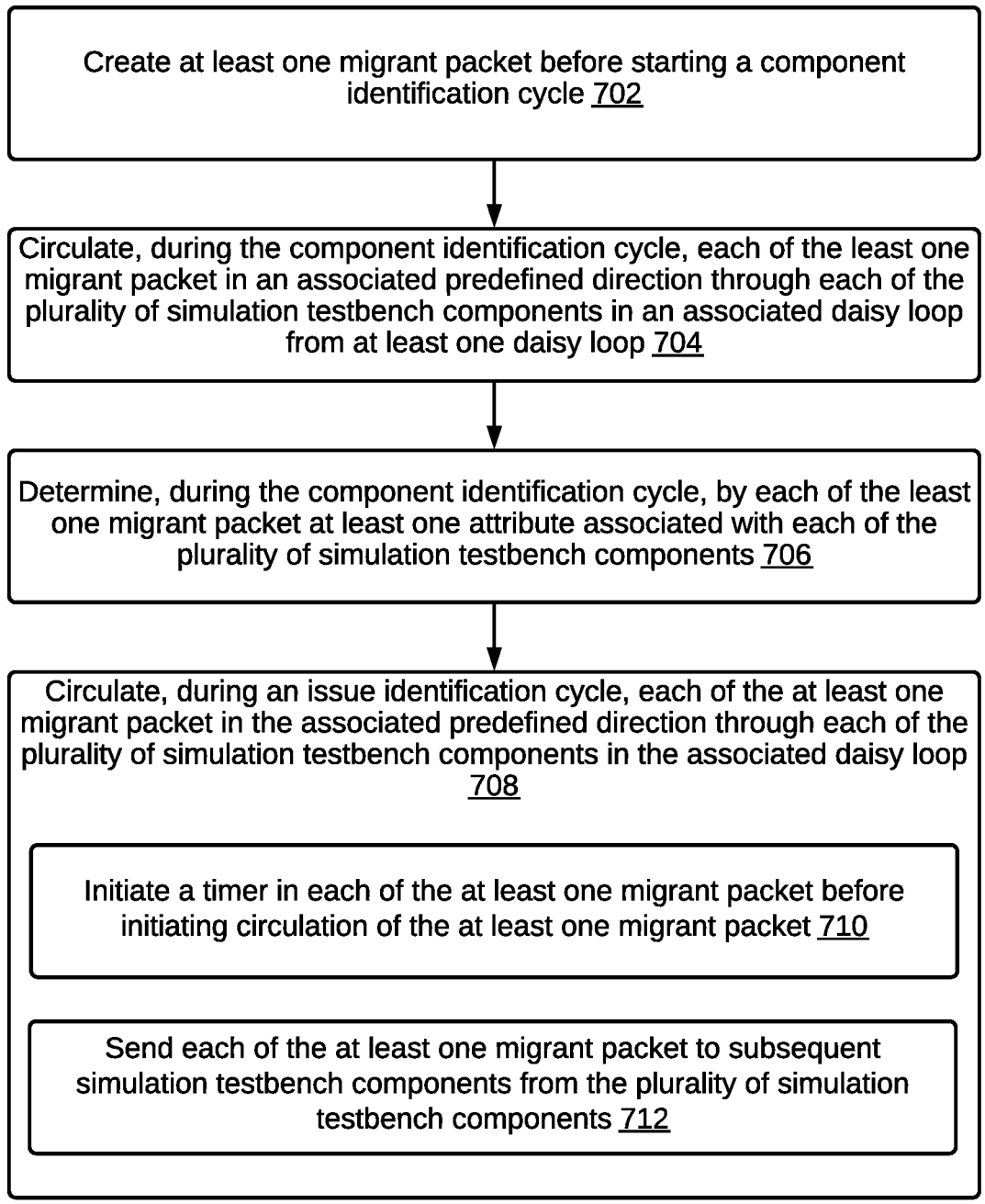
FIG. 7 illustrates a flowchart of a process performed by a simulation testbench component during a simulation for identifying locked-up simulation testbench components, in accordance with an embodiment.

Referring now to FIG. 7, a process performed by a simulation testbench component during a simulation for identifying locked-up simulation testbench components is illustrated via flowchart, in accordance with an embodiment. In order to identify one or more locked-up simulation testbench components from the plurality of simulation testbench components, initially, at step 702, the simulation testbench component may be configured to create at least one migrant packet. The at least one migrant packet may be created before starting a component identification cycle. In an embodiment, the simulation testbench component configured to create the at least one migrant packet may correspond to the initiator simulator component. In reference to FIG. 1, the initiator simulation testbench component may be 'Component A'. As will be appreciated, the initiator simulation testbench component may create each of the at least one migrant packet only once before starting the component identification cycle. Therefore, at any point in time, there may be only two migrants packets, i.e., the first migrant packet (also referred as the clockwise migrant packet) and the second migrant packet (i.e., the counter-clockwise migrant packet).

Once each of the at least one migrant packet is created, then, at step 704, each of the at least one migrant packet may be circulated in an associated predefined direction through each of the plurality of simulation testbench components in an associated daisy loop from at least one daisy loop. In an embodiment, the first daisy loop from the at least one daisy loop may connect the plurality of simulation testbench components in a clockwise direction with respect to the first simulation testbench component, i.e., the initiator simulation testbench component. In addition, the second daisy loop form the at least one daisy loop may connect the plurality of simulation testbench components in a counter-clockwise direction with respect to the first simulation testbench component.

Further, the at least one migrant packet may include the first migrant packet and the second migrant packet. The first migrant packet from the at least one migrant packet may be circulated in the clockwise direction. In other words, the predefined direction associated with the first migrant packet in which the first migrant packet is circulated may correspond to the clockwise direction along a clockwise daisy loop (i.e., the first daisy loop) from the at least one daisy loop. Moreover, the second migrant packet from the at least one migrant packet may be circulated in the counter-clockwise direction. In other words, the predefined direction associated with the second migrant packet in which the second migrant packet is circulated may correspond to the counter-clockwise direction along a counter-clockwise daisy loop (i.e., the second daisy loop) from the at least one daisy loop.

Further, while circulating each of the at least one migrant packet in the associated pre-defined direction, each of the at least one migrant packet may be configured to determine the sequence in which the plurality of simulation testbench components may be connected in the associated daisy loop. In an embodiment, the sequence may include the ordered list of unique IDs associated with each of the plurality of simulation testbench components. In other words, when each of the at least one migrant packet gets transferred from one simulation testbench component to the subsequent simulation testbench component present in the associated daisy loop, then each of the at least one migrant packet may learn the sequence (also referred as path) followed by the at least one migrant packet during the component identification cycle.

Further, at step 706, each of the at least one migrant packet may be configured to determine at least one attribute associated with each of the plurality of simulation testbench components during the component identification cycle. The at least one attribute associated with a simulation testbench component from the plurality of simulation testbench components may include the unique ID of the simulation testbench component and the timeout value associated with the simulation testbench component. In other words, a simulation testbench component from the plurality of simulation testbench components connected in the associated daisy loop may have an associated unique ID. The associated unique ID may be used to identify each of the plurality of simulation testbench components uniquely. In addition, the timeout value associated with the simulation testbench component may correspond to a maximum time for which the simulation testbench component may hold each of the at least one migrant packet before sending it to the subsequent simulation testbench component of the associated daisy loop. In an embodiment, during the component identification cycle a common timeout value may be used for each of the plurality of simulation testbench components connected in the sequence in the associated daisy loop. The common timeout value used for each of the plurality of simulation testbench components may be user configurable.

Once the at least one attribute and the sequence associated with each of the plurality of simulation testbench components is determined by the initiator simulation testbench component, at step 708, the initiator simulation testbench component may be configured to circulate each of the at least one migrant packet in the associated predefined direction during issue identification cycle. In an embodiment, each of the at least one migrant packet may be circulated through each of the plurality of simulation testbench components in the associated daisy loop. Further, during issue identification cycle, before initiating circulation of each of the at least one migrant packet, a timer may be initiated in each of the at least one migrant packet as depicted via step 710. Once the timer is initiated, at step 712, the initiator simulation testbench component may send each of the at least one migrant packet to subsequent simulation testbench components from the plurality of simulation testbench components. In an embodiment, each of the at least one migrant packet may be passed on in a sequential manner amongst the plurality of simulation testbench components based on the associated daisy loop.

Figure 8:
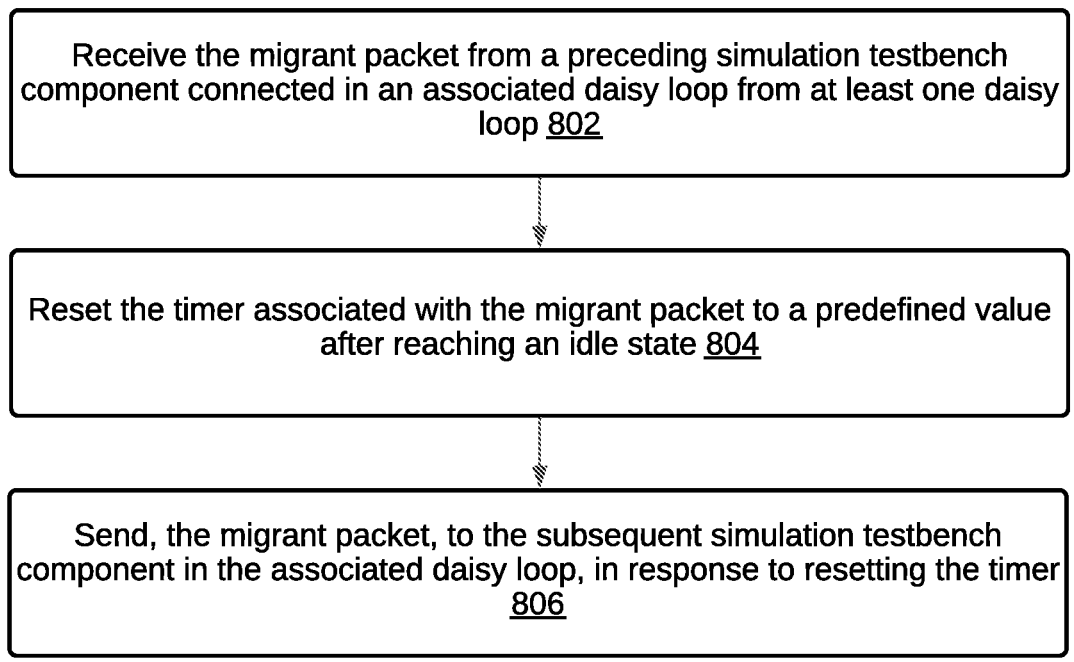
FIG. 8 illustrates a flowchart of a process performed by a simulation testbench component during a simulation for identifying locked-up simulation testbench components, in accordance with an embodiment.

Referring now to FIG. 8, a process performed by a simulation testbench component during a simulation for identifying locked-up simulation testbench components is illustrated via flowchart, in accordance with an embodiment. In present embodiment, the simulation testbench component may correspond to one of the subsequent simulation testbench components from the plurality of simulation of components. At step 802, the migrant packet may be received from a preceding simulation testbench component connected in the associated daisy loop from the at least one daisy loop. Upon receiving the migrant packet, at step 804, a timer associated with the migrant packet may be reset to a predefined value by the subsequent simulation testbench component after reaching an idle state. By way of an example, the predefined value to which the timer associated with the migrant packet is reset may be defined to be zero, i.e., '0'. Moreover, the timer associated with the migrant packet may be reset upon identifying non-busy state of the subsequent simulation testbench component. In an embodiment, the idle state determined for each of the subsequent simulation testbench components connected in the sequence in the associated daisy loop may enable a user (e.g., a tester) to decide when to end the simulation. The decision to end the simulation may be based on the idle state for a specified number of iterations, of each of the plurality of simulation testbench components connected in each of the at least one daisy loop. The each of the at least one daisy loop may include the clockwise daisy loop and the counter-clockwise daisy loop.

Once the timer for the migrant packet is reset based on the non-busy state of the subsequent simulation testbench component, then at step 806, the migrant packet may be sent to the subsequent simulation testbench component in the associated daisy loop. By way of an example, in reference to FIG. 1, in the clockwise daisy loop, i.e., in the clockwise direction 102, the 'Component B' may receive the CW migrant packet 106 from the 'Component A'. Hence, in present example, the preceding simulation testbench component may correspond to the 'Component A'. Moreover, the subsequent component may correspond to the 'Component B'.

In order to send the migrant packet, each of the subsequent simulation testbench components may initially check if it is busy. Based on the check performed, when a simulation testbench component from the subsequent simulation testbench components that will next receive the migrant packet is identified to be busy, then the simulation testbench component may wait until the simulation testbench component may become non-busy. For example, when each of the plurality of simulation testbench components is a driver, then non-busy state for each of the subsequent simulation testbench components may correspond to remaining idle or waiting for a data packet to drive on an interface. Moreover, busy state for each of the plurality of simulation testbench components when it is the driver may correspond to driving the data packet to the DUT. Additionally, when each of the plurality of simulation testbench components is a monitor, then non-busy state for each of the plurality of simulation testbench components may correspond to remaining idle or waiting to see a data packet start on an interface that is monitored. Moreover, busy state for each of the plurality of simulation testbench components when it is the monitor may correspond to monitoring the data packet on the interface.

Once the check is performed and the simulation testbench component is identified to be non-busy, then the simulation testbench component stops the timer in the migrant packet, upon identifying the timer to be running. Further, the simulation testbench component receiving the migrant packet may provide its unique ID to the migrant packet. Thereafter, the simulation testbench component waits for a certain amount of resting time before sending the migrant packet to next simulation testbench component in the associated daisy loop. In present embodiment, the resting time may correspond to a very small amount of time used to ensure that the migrant packet does not get caught in untimed loops in each of the at least one daisy chain. In addition, the resting time described in the present embodiment may be user configured. Once the resting time is over, the simulation testbench component may restart the timer in the migrant packet. Once the timer is restarted, the simulation testbench component may send the migrant packet to the next simulation testbench component in the associated daisy loop.

Various embodiments provide method and system for identifying locked-up simulation testbench components during a simulation. The disclosed method and system may create, by an initiator simulation testbench component from a plurality of simulation testbench components, at least one migrant packet. The plurality of simulation testbench components may be sequentially connected in at least one daisy loop. Further, the disclosed method and system may circulate, during a component identification cycle, each of the at least one migrant packet in an associated predefined direction through each of the plurality of simulation testbench components in the associated daisy loop from the at least one daisy loop. Each of the least one migrant packet may return to the initiator simulation testbench component at completion of the component identification cycle. Moreover, circulation of each of the at least one migrant packet during the component identification cycle may include determination of at least one attribute associated with each of the plurality of simulation testbench components by each of the at least one migrant packet.

In addition, the disclosed method and system may circulate, during an issue identification cycle, each of the least one migrant packet in the associated predefined direction through each of the plurality of simulation testbench components in the associated daisy loop. Moreover, in order to circulate each of the at least one migrant packet during the issue identification cycle, the disclosed method and the system may initiate, by the initiator simulation testbench component, a timer in each of the at least one migrant packet before initiating circulation of the at least one migrant packet. Further, to circulate each of the at least one migrant packet during the issue identification cycle, the disclosed method and the system may send, by the initiator simulation testbench component, each of the at least one migrant packet to subsequent simulation testbench components from the plurality of simulation testbench components. Each of the at least one migrant packet is passed on in a sequential manner amongst the plurality of simulation testbench components based on the associated daisy loop. Thereafter, to circulate each of the at least one migrant packet during the issue identification cycle, the disclosed method and the system may perform, by each of the subsequent simulation testbench components, at least one of: receiving a migrant packet from a preceding simulation testbench component in the associated daisy loop, resetting the timer associated with the migrant packet to a predefined value after reaching an idle state, and sending, the migrant packet, to a subsequent simulation testbench component in the associated daisy loop, in response to resetting the timer. Lastly, the disclosed method and the system may identify, by a migrant packet from the at least one migrant packet, a locked-up simulation testbench component from the subsequent simulation testbench components based on the at least one attribute associated with locked-up simulation testbench component. The locked-up simulation testbench component fails to reset the timer associated with the migrant packet.

The disclosed method and system may provide some advantages like, the disclosed method and the system may be methodologically independent and hence may be used across any of an existing industry standard verification methodology. Further, the disclosed method and the system may provide an ability to identify simulation testbench components lock-up conditions quickly without wasting much simulation time, once the simulation testbench components lock-up conditions have occurred. In addition, the disclosed method and the system may provide an ability to identify a locked-up simulation testbench component responsible for causing the simulation testbench component lock-up conditions. Moreover, the disclosed method and the system may enable a user (e.g., a tester) to add a new simulation testbench component anywhere in the at least one daisy loop that needs to be monitored for lock-up conditions during the simulation. Once the new simulation testbench component is added, each of the at least one migrant packet of the disclosed method and the system may monitor the new simulation testbench component after completing the component identification cycle.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for identifying locked-up simulation testbench components during a simulation, the method comprising:
creating, by an initiator simulation testbench component from a plurality of simulation testbench components, at least one migrant packet, wherein the plurality of simulation testbench components are sequentially connected in at least one daisy loop;
circulating, during a component identification cycle, each of the at least one migrant packet in an associated predefined direction through each of the plurality of simulation testbench components in the associated daisy loop from the at least one daisy loop, wherein each of the at least one migrant packet returns to the initiator simulation testbench component at completion of the component identification cycle, and wherein circulating comprises:
determining by each of the at least one migrant packet, at least one attribute associated with each of the plurality of simulation testbench components;
circulating, during an issue identification cycle, each of the at least one migrant packet in the associated predefined direction through each of the plurality of simulation testbench components in the associated daisy loop, wherein circulating each of the at least one migrant packet comprises:
initiating, by the initiator simulation testbench component, a timer in each of the at least one migrant packet before initiating circulation of the at least one migrant packet;
sending, by the initiator simulation testbench component, each of the at least one migrant packet to subsequent simulation testbench components from the plurality of simulation testbench components, wherein each of the at least one migrant packet is passed on in a sequential manner amongst the plurality of simulation testbench components based on the associated daisy loop;
performing, by each of the subsequent simulation testbench components, at least one of:
receiving a migrant packet from a preceding simulation testbench component in the associated daisy loop;
resetting the timer associated with the migrant packet to a predefined value after reaching an idle state; and
sending, the migrant packet, to a subsequent simulation testbench component in the associated daisy loop, in response to resetting the timer; and
identifying, by a migrant packet from the at least one migrant packet, a locked-up simulation testbench component from the subsequent simulation testbench components based on the at least one attribute associated with locked-up simulation testbench component, wherein the locked-up simulation testbench component fails to reset the timer associated with the migrant packet.

2. The method of claim 1, wherein the at least one attribute of a simulation testbench component from the plurality of simulation testbench components comprises a unique Identifier (ID) of the simulation testbench component and a timeout value associated with the simulation testbench component.

3. The method of claim 2, further comprising reporting the unique ID of the locked-up simulation testbench component, in response to identifying the locked-up simulation testbench component.

4. The method of claim 2, wherein circulating each of the at least one migrant packet in the associated predefined direction during the component identification cycle comprises:
determining by each of the at least one migrant packet a sequence in which the plurality of simulation testbench components are connected in the associated daisy loop, wherein the sequence comprises an ordered list of unique IDs associated with each of the plurality of simulation testbench components.

5. The method of claim 1, further comprising terminating the simulation in response to identifying the locked-up simulation testbench component.

6. The method of claim 1, further comprising performing at least one of a plurality of user defined actions, in response to identifying the locked-up simulation testbench component, wherein the plurality of user defined actions comprises at least one of:
resetting the locked-up simulation testbench component; and
resetting a Design Under Test (DUT).

7. The method of claim 1, wherein identifying the locked-up simulation testbench component comprises:
comparing a timer value of the locked-up simulation testbench component that indicates the time elapsed since the locked-up simulation testbench component received the migrant packet with a timeout value associated with the locked-up simulation testbench component; and
establishing locking of the locked-up simulation testbench component when the timer value is greater than or equal to the timeout value.

8. The method of claim 1, further comprising:
identifying a non-participating simulation testbench component from the plurality of simulation testbench components based on a non-participation field activated in the non-participating simulation testbench component; and
ignoring the non-participating simulation testbench component by each of the at least one migrant packet.

9. The method of claim 1, wherein a first daisy loop from the at least one daisy loop connects the plurality of simulation testbench components in a clockwise direction with respect to the first simulation testbench component and a second daisy loop form the at least one daisy loop connects the plurality of simulation testbench components in a counter-clockwise direction with respect to the first simulation testbench component.

10. The method of claim 9, wherein:
a first migrant packet from the at least one migrant packet is circulated in the clockwise direction, wherein the predefined direction associated with the first migrant packet is the clockwise direction along a clockwise daisy loop from the at least one daisy loop; and a second migrant packet from the at least one migrant packet is circulated in the counter-clockwise direction, wherein the predefined direction associated with the second migrant packet is the counter-clockwise direction along a counter-clockwise daisy loop from the at least one daisy loop.

11. A simulation testbench component for identifying locked-up simulation testbench components during a simulation, the simulation testbench component configured to:

create at least one migrant packet before starting a component identification cycle; and circulate, during the component identification cycle, each of the at least one migrant packet in the associated predefined direction through each of the plurality of simulation testbench components in an associated daisy loop from at least one daisy loop, wherein each of the at least one migrant packet returns to the simulation testbench component at completion of the component identification cycle;

determine, during the component identification cycle, by each of the at least one migrant packet, at least one attribute associated with each of the plurality of simulation testbench components;

circulate, during an issue identification cycle, each of the at least one migrant packet in the associated predefined direction through each of the plurality of simulation testbench components in the associated daisy loop, wherein to circulate each of the at least one migrant packet, the simulation testbench component is configured to:

initiate a timer in each of the at least one migrant packet before initiating circulation of the at least one migrant packet; and send each of the at least one migrant packet to subsequent simulation testbench components from the plurality of simulation testbench components, wherein each of the at least one migrant packet is passed on in a sequential manner amongst the plurality of simulation testbench components based on the associated daisy loop.

12. A simulation testbench component for identifying locked-up simulation testbench components during a simulation, the simulation testbench component is configured to:

receive, during an issue identification cycle, a migrant packet from a preceding simulation testbench component connected in an associated daisy loop from at least one daisy loop;

reset a timer associated with the migrant packet to a predefined value after reaching an idle state, wherein the timer associated with the migrant packet is reset upon identifying non-busy state of a subsequent simulation testbench component; and send, the migrant packet, to the subsequent simulation testbench component in the associated daisy loop, in response to resetting the timer.

13. The method of claim 12, wherein the simulation testbench component is configured to receive at least one attribute associated with each of a plurality of simulation testbench components connected in the associated daisy loop from at least one daisy loop.

14. A system for identifying locked-up simulation testbench components during a simulation, the system comprising:

a processor; and a memory coupled to the processor, wherein the memory stores processor executable instructions, which, on execution, causes the processor to:

create, by an initiator simulation testbench component from a plurality of simulation testbench components, at least one migrant packet, wherein the plurality of simulation testbench components are sequentially connected in at least one daisy loop;

circulate, during a component identification cycle, each of the at least one migrant packet in an associated predefined direction through each of the plurality of simulation testbench components in the associated daisy loop from the at least one daisy loop, wherein each of the at least one migrant packet returns to the initiator simulation testbench component at completion of the component identification cycle, and wherein, to circulate, the processor executable instruction further causes the process to:

determine, by each of the at least one migrant packet, at least one attribute associated with each of the plurality of simulation testbench components;

circulate, during an issue identification cycle, each of the at least one migrant packet in the associated predefined direction through each of the plurality of simulation testbench components in the associated daisy loop, wherein, to circulate each of the least one migrant packet, the processor executable instruction further causes the process to:

initiate, by the initiator simulation testbench component, a timer in each of the at least one migrant packet before initiating circulation of the at least one migrant packet;

send, by the initiator simulation testbench component, each of the at least one migrant packet to subsequent simulation testbench components from the plurality of simulation testbench components, wherein each of the at least one migrant packet is passed on in a sequential manner amongst the plurality of simulation testbench components based on the associated daisy loop;

perform, by each of the subsequent simulation testbench components, at least one of:

receive a migrant packet from a preceding simulation testbench component in the associated daisy loop;

reset the timer associated with the migrant packet to a predefined value after reaching an idle state; and send, the migrant packet, to a subsequent simulation testbench component in the associated daisy loop, in response to resetting the timer; and identify, by a migrant packet from the at least one migrant packet, a locked-up simulation testbench component from the subsequent simulation testbench components based on the at least one attribute associated with locked-up simulation testbench component, wherein the locked-up simulation testbench component fails to reset the timer associated with the migrant packet.

15. The system of claim 14, wherein the at least one attribute of a simulation testbench component from the plurality of simulation testbench components comprises a unique Identifier (ID) of the simulation testbench component and a timeout value associated with the simulation testbench component.

16. The system of claim 15, wherein the processor executable instructions further cause the processor to report the unique ID of the locked-up simulation testbench component, in response to identifying the locked-up simulation testbench component.

17. The system of claim 15, wherein, to circulate each of the least one migrant packet in the associated predefined direction during the component identification cycle, the processor executable instructions further cause the processor to:
determine by each of the least one migrant packet a sequence in which the plurality of simulation testbench components are connected in the associated daisy loop, wherein the sequence comprises an ordered list of unique IDs associated with each of the plurality of simulation testbench components.

18. The system of claim 14, wherein the processor executable instructions further cause the processor to terminate the simulation in response to identifying the locked-up simulation testbench component.

19. The system of claim 14, wherein the processor executable instructions further cause the processor to perform at least one of a plurality of user defined actions, in response to identifying the locked-up simulation testbench component, wherein the plurality of user defined actions comprises at least one of:
resetting the locked-up simulation testbench component; and
resetting a Design Under Test (DUT).

20. The system of claim 14, wherein, to identify the locked-up simulation testbench component the processor executable instructions further cause the processor to:
compare a timer value of the locked-up simulation testbench component that indicates the time elapsed since the locked-up simulation testbench component received the migrant packet with a timeout value associated with the locked-up simulation testbench component; and
establish locking of the locked-up simulation testbench component when the timer value is greater than or equal to the timeout value.

21. The system of claim 14, wherein the processor executable instructions further cause the processor to:
identify a non-participating simulation testbench component from the plurality of simulation testbench components based on a non-participation field activated in the non-participating simulation testbench component; and
ignore the non-participating simulation testbench component by each of the at least one migrant packet.

22. The system of claim 14, wherein a first daisy loop from the at least one daisy loop connects the plurality of simulation testbench components in a clockwise direction with respect to the first simulation testbench component and a second daisy loop form the at least one daisy loop connects the plurality of simulation testbench components in a counter-clockwise direction with respect to the first simulation testbench component.

23. The system of claim 22, wherein:
a first migrant packet from the at least one migrant packet is circulated in the clockwise direction, wherein the predefined direction associated with the first migrant packet is the clockwise direction along a clockwise daisy loop from the at least one daisy loop; and
a second migrant packet from the at least one migrant packet is circulated in the counter-clockwise direction, wherein the predefined direction associated with the second migrant packet is the counter-clockwise direction along a counter-clockwise daisy loop from the at least one daisy loop.

* * * * *